United States Patent [19]
Sugai

[11] Patent Number: 5,183,181
[45] Date of Patent: Feb. 2, 1993

[54] SINGULATING ASSEMBLY FOR PRESENTING WORK PIECES

[75] Inventor: Maureen Sugai, Mesa, Ariz.

[73] Assignee: Motorola, Inc., Schaumburg, Ill.

[21] Appl. No.: 766,376

[22] Filed: Sep. 27, 1991

[51] Int. Cl.$^5$ ............................................. A47F 1/04
[52] U.S. Cl. ..................................... 221/155; 221/301
[58] Field of Search ............... 221/301, 298, 289, 268, 221/273, 274, 155

[56] References Cited

U.S. PATENT DOCUMENTS

| | | | |
|---|---|---|---|
| 3,702,665 | 11/1972 | Raines | 221/301 |
| 3,797,701 | 3/1974 | Allocco et al. | 221/155 |
| 3,991,907 | 11/1976 | Kull | 221/301 |
| 4,222,166 | 9/1980 | Kurek et al. | 29/831 |
| 4,759,435 | 7/1988 | Cedrone | 221/277 |

FOREIGN PATENT DOCUMENTS 0166409 1/1986 European Pat. Off.

Primary Examiner—Robert P. Olszewski
Assistant Examiner—Kenneth Noland
Attorney, Agent, or Firm—Joe E. Barbee

[57] ABSTRACT

A gravity fed culling apparatus (10) capable of singulating work pieces (12). The culling apparatus (10) comprises a transport track (11) and a rotating device (14) wherein the rotating device (14) has a first and a second protrusion (17 and 18, respectively) which cooperate with the transport track (11). A plurality of work pieces (12) are conveyed along the transport track (11) to an inspection site (13). After inspection, at least one work piece (12) is separated from the plurality of work pieces (12) and continues along the transport track (11).

9 Claims, 3 Drawing Sheets

SINGULATING ASSEMBLY FOR PRESENTING WORK PIECES

BACKGROUND OF THE INVENTION

This invention relates, in general, to a work piece separation apparatus, and more particularly to a gravity fed work piece singulation assembly capable of presenting work pieces to an inspection site.

In today's competitive marketplace, where quality of goods and services is demanded, most manufacturing facilities include a minimum of one inspection step in their production processes. Typically, the inspection step includes stopping, inspecting, and releasing a plurality of work pieces. In many instances, the work pieces are released individually rather than as a group, a method commonly referred to as singulation. Further, the inspection process entails not merely stopping the work pieces, but stopping them in an exact, predetermined, location.

One apparatus that manufacturers have used to stop and inspect work pieces has been a two wheel system comprising a roller wheel and a drive wheel wherein each wheel is actuated by a motor. Unfortunately, this implementation uses two motors thereby adding to the initial cost of the apparatus as well as the cost for maintaining the apparatus. What is more, inspection of work pieces in a singulation regime is difficult because the view of the work pieces is obstructed by the wheels. Moreover, the location at which work pieces are to be stopped is imprecise, further hampering the visual inspection process.

A second type of apparatus used by many manufacturers to separate work pieces is a solenoid driven stop pin, wherein the stop pin is capable of stopping a single work piece or a plurality of work pieces. Typically, these types of culling apparatus require two solenoids, thereby adding to the cost of the apparatus. Moreover, the solenoid apparatus increases the time required to complete the culling process, commonly referred to as increasing the cycle time. In addition, the solenoid apparatus tends to damage work pieces. A third type of culling apparatus capable of singulating work pieces is a motor driven inverting apparatus. The primary disadvantage of this apparatus is the increase in cycle time it incurs by inverting the work pieces, leaving them in an incorrect orientation for further production steps.

Accordingly, it would be beneficial to have a means for culling work pieces which is also capable of inspecting the work pieces; and in particular for the culling step to be singulation. Further, it is desirable for the culling apparatus to include a mechanism for stopping work pieces at a precise location to facilitate visual inspection. Moreover, the culling apparatus should not increase cycle time. Finally, it would be advantageous for the system to be inexpensive to purchase as well as to maintain.

SUMMARY OF THE INVENTION

Briefly stated, the present invention is a work piece separation apparatus which cooperates with a gravity fed track. The work piece separation apparatus comprises a means for culling at least one work piece from a plurality of work pieces; wherein the means for culling is driven by a single reciprocating drive. Further, the means for culling includes a first gating mechanism, that blocks a path of the plurality of work pieces on the track, and a second gating mechanism that frictionally restrains the plurality of work pieces. The track comprises at least one insertion slot to facilitate interaction between the track and the means for culling.

DETAILED DESCRIPTION OF THE DRAWINGS

Figure 1:
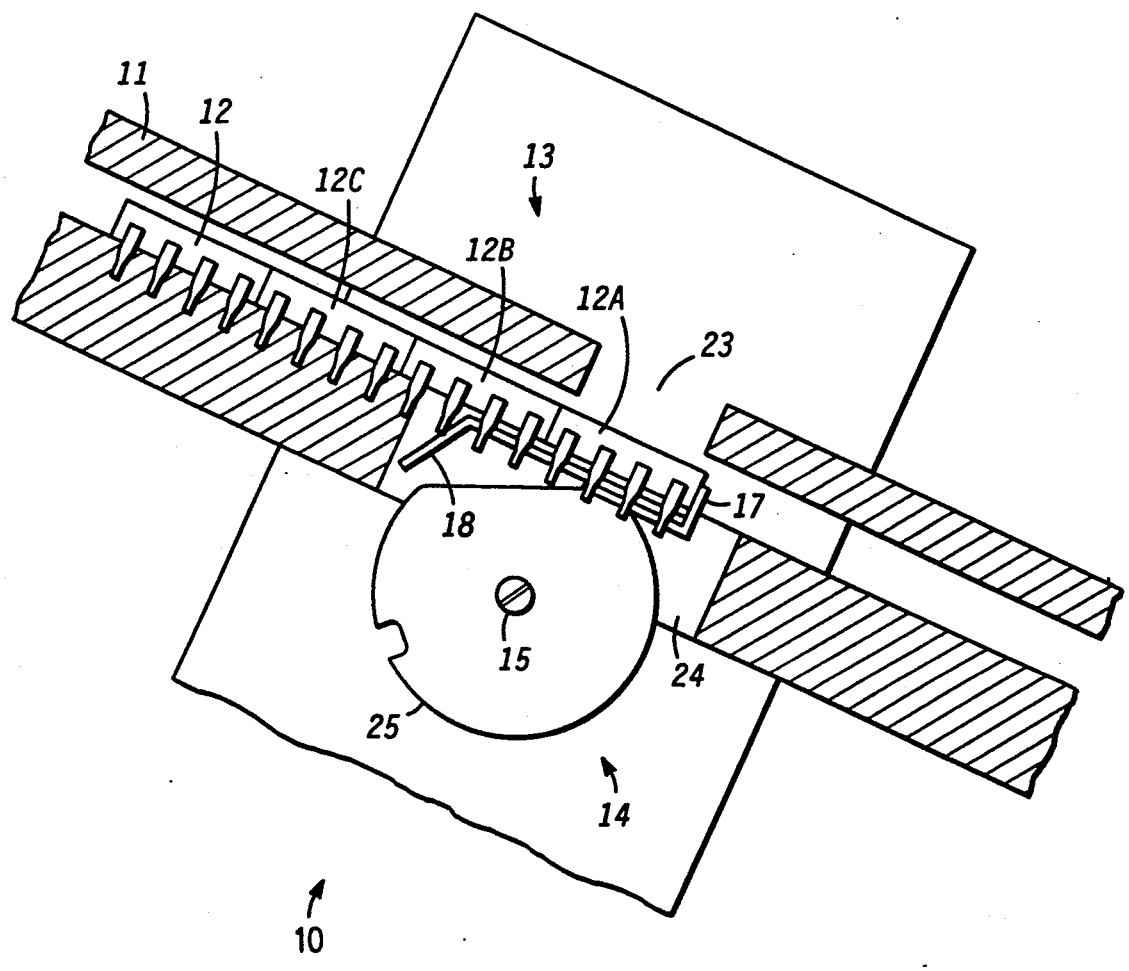
FIG. 1 is a cross-sectional view of a culling apparatus in accordance with the present invention.
Figure 2:
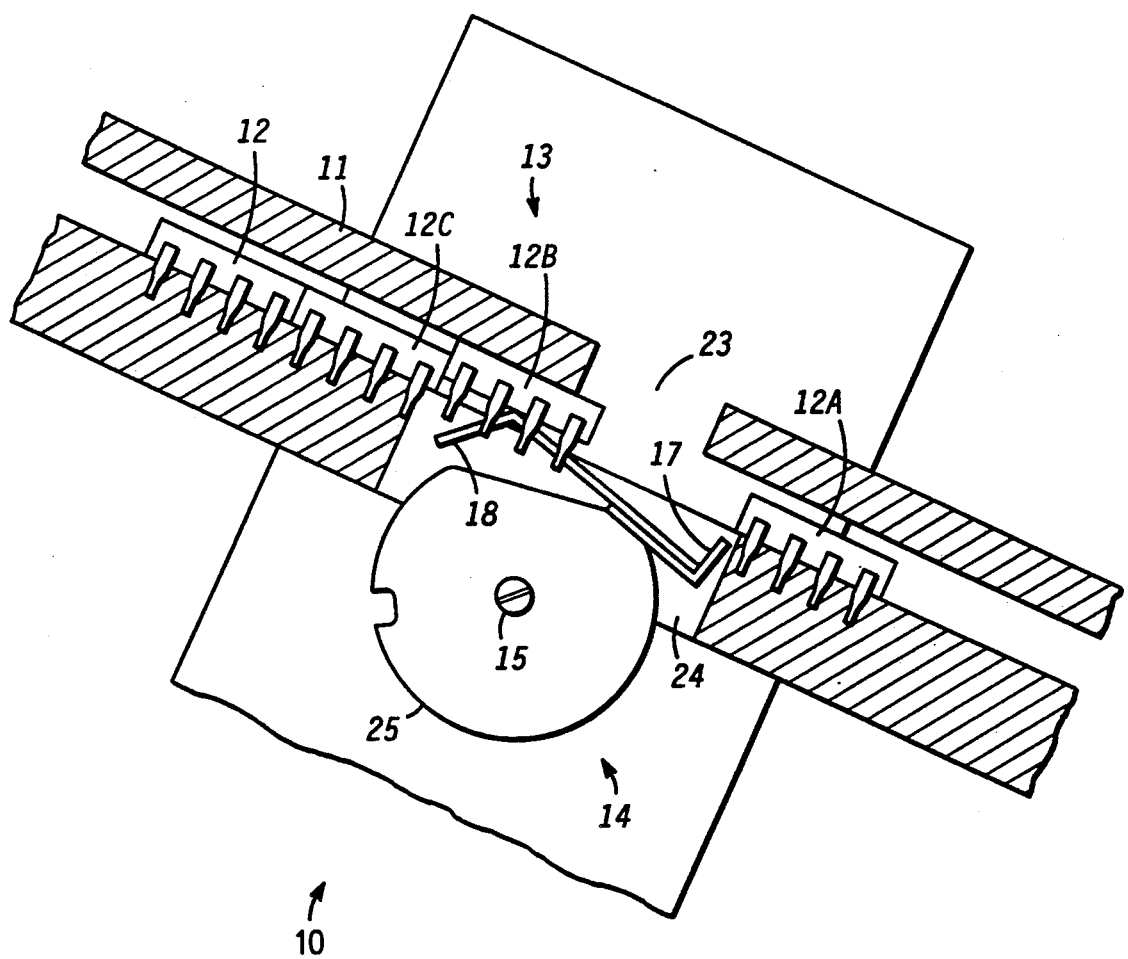
FIG. 2 is a cross-sectional view showing the culling apparatus of FIG. 1 in a second position.

A culling apparatus affords manufacturers the opportunity to dispose of flawed or damaged work pieces rather than allow reject material to continue through an expensive processing operation or be shipped to customers. FIG. 1 and FIG. 2 are illustrations of cross-sectional views of a portion of an embodiment of a work piece culling apparatus 10. FIG. 1 shows work piece culling apparatus 10 oriented to stop a plurality of work pieces 12, along a linear path; while FIG. 2 shows work piece culling apparatus 10 oriented to function as a singulating assembly, in which a work piece 12A is singulated from the plurality of work pieces 12 and moves along a track 11. In a preferred embodiment, the plurality of work pieces 12X are packaged integrated circuits.

Work piece culling apparatus 10 comprises a transport track 11 having an inspection site 13. In a preferred embodiment, inspection site 13 has an inspection window 23 and at least one insertion slot 24. In a further embodiment track 11 is inclined at least 25 degrees relative to a horizontal axis and is a gravity fed track.

A means for culling 14, also referred to as a means for rotating 14 or a rotating means 14, cooperates with transport track 11, wherein means for culling 14 includes a rotational structure 25 which is reciprocally driven by a shaft 15 of a computer controlled motor (not shown). In other words, the computer controlled motor rotates rotational structure 25 in both clockwise and counterclockwise directions. Means for culling 25 further includes a first protrusion 17, and a second protrusion 18. Moreover, first protrusion 17 serves as a first gating mechanism 17 and second protrusion 18 serves as a second gating mechanism 18. In one embodiment, first protrusion 17 and second protrusion 18 are separate units with each unit mounted to a circumference of rotational structure 25. Moreover, first protrusion 17 is a L-shaped and second protrusion 18 is beveled, wherein the bevel shape prevents a final work piece 12 in a line from becoming jammed as second protrusion 18 disengages from transport track 11. In a further embodiment first protrusion 17 is stainless steel and second protrusion 18 is spring tempered beryllium copper.

In an alternate embodiment, first and second protrusions, 17 and 18 respectively, are a unitary unit. In other words protrusions 17 and 18 are not separate pieces, hence both units are fabricated from the same piece of material. In one embodiment, the material for the unitary unit is spring tempered beryllium copper; although the materials for first and second protrusions, 17 and 18 respectively, are not limited to those specified in these embodiments. However in the two piece embodiment, it is desirable that the material for first protrusion 17 is nonresilient, and that the material for second protrusion 18 is resilient, and capable of maintaining its resilience after deformation by a weight of at least one ounce.

In a preferred embodiment, second protrusion 18 restrains a work piece 12B immediately following work piece 12A; hence the plurality of work pieces 12 are singulated. It will be understood that the present invention does not limit the length of second protrusion 18 as well as the length and location of insertion slot 24. In other words the lengths of second protrusion 18 and insertion slot 24 may be longer to allow separation of a plurality of work pieces 12, rather than singulation. It will be further understood that the present invention does not limit the implementation of insertion slot 24. Hence, insertion slot 24 may be a plurality of insertion slots 24 wherein their sizes and locations are a function of the number of work pieces 12 to be culled.

The culling process begins by shaft 15 rotating rotational structure 25 in a first direction, thereby inserting first protrusion 17 into insertion slot 24. Simultaneously, second protrusion 18 is removed from insertion slot 24. A plurality of work pieces 12 are placed on transport track 11 and move solely under the force of gravity along transport track 11 to inspection site 13 The path of the plurality of work pieces 12 is blocked by first protrusion 17, hence movement by the plurality of work pieces 12 is curtailed. Work piece 12A abuts first protrusion 17 such that a top surface of a work piece 12A is below inspection window 23. A top portion of work piece 12A is inspected by viewing through inspection window 23.

After work piece 12A is inspected, shaft 15 rotates rotational structure 25 in a second direction thereby removing first protrusion 17 from insertion slot 24; thus first protrusion 17 no longer blocks the path of the plurality of work pieces 12. Simultaneously, a portion of second protrusion 18 is inserted into insertion slot 24 and contacts a next work piece 12B in line. In a preferred embodiment, as well as in the illustrations shown in FIG. 1 and FIG. 2, next work piece 12B immediately follows work piece 12A; although the portion of second protrusion 18 may contact and thereby restrain a predetermined work piece 12 further removed from the work piece 12A being inspected. The portion of second protrusion 18 applies a force against a lower surface of subsequent work piece 12B, pinning this work piece against a portion of transport track 11. Thus work piece 12B is restrained; thereby blocking the path along transport track 11 and preventing the remainder of the plurality of work pieces 12 from travelling down transport track 11. Rotating means 25 oscillates at a rate sufficient to restrain the next work piece 12B before the next work piece 12B moves on transport track 11.

Figure 3:
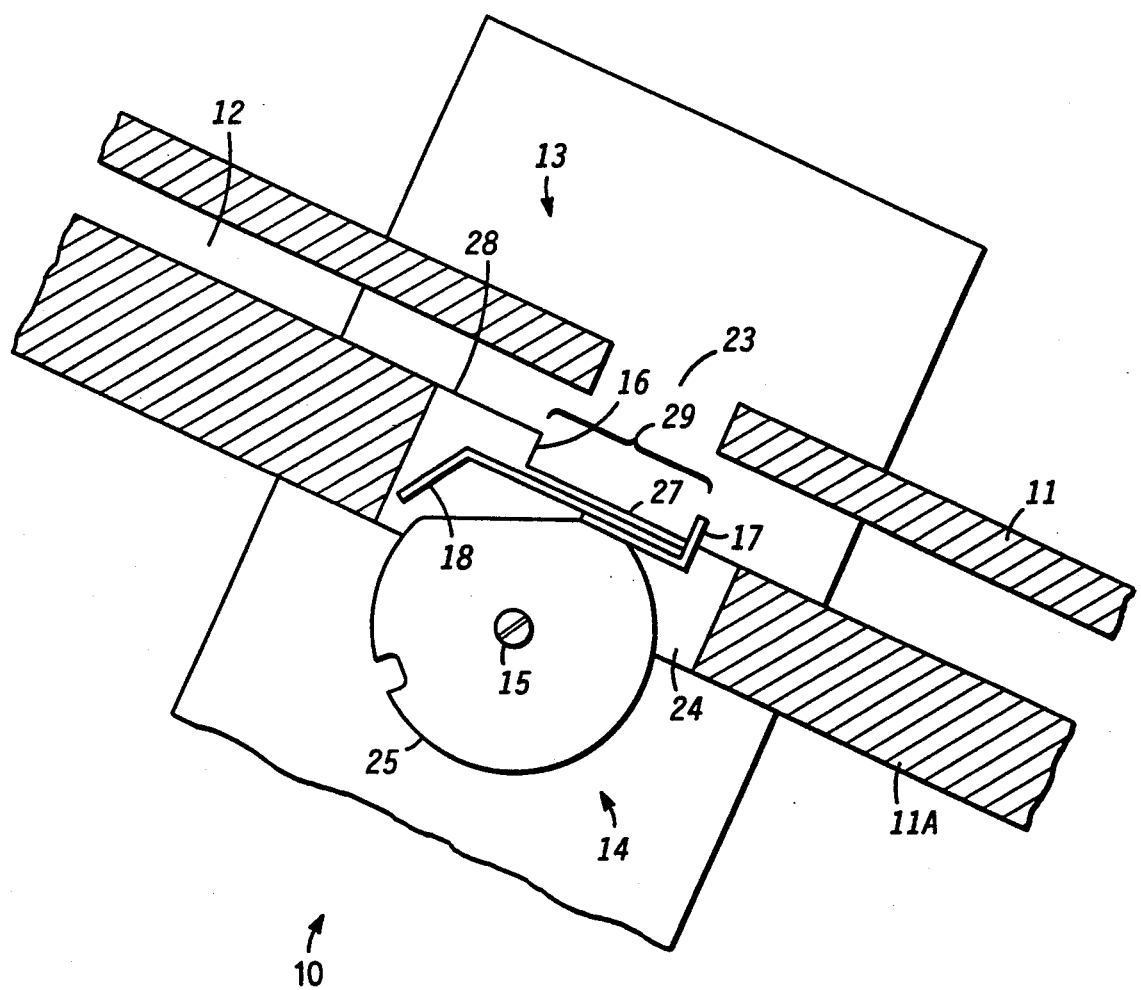
FIG. 3 is a cross-sectional side view of an embodiment of the present invention wherein the transport track has a step.

FIG. 3 shows an embodiment of work piece inspection station 10 wherein transport track 11A has a first portion 28 higher than a second portion 27. A step 16 between first portion 28 and second portion 27 has a height less than the thickness of a work piece. As in the embodiments shown in FIG. 1 and FIG.2, transport track 11A includes at least one insertion slot 24 which cooperates with first protrusion 17, and second protrusion 18. In a preferred embodiment, a capture spot 29 is formed during the culling process when first protrusion 17 is inserted into insertion slot 24. Capture spot 29 is defined as the length of transport track 11A between first protrusion 17 and a portion of transport track 11A having step 16. For operation of culling apparatus 10 as a singulator the length of capture spot 29 must accommodate one work piece 12. Capture spot 29 ensures that work piece 12 will stop under inspection window 23. What is more, capture spot 29 serves to prevent work piece 12 from bouncing when initially contacting first protrusion 17.

By now it should be appreciated that there has been provided an improved method for culling and inspecting work pieces. In particular, the improvements are realized by a reduction in both cycle time and costs. Cycle time improvement stems from a combination of several factors including: precision stop positioning, decreased damage to work pieces, unobstructed work piece viewing, and proper work piece orientation. The two main areas of cost reduction are in the initial cost of the culling apparatus and the capital required to operate and maintain the apparatus. Moreover, a savings is realized by the culling apparatus not damaging work pieces.

In addition to these benefits, the culling apparatus can be configured to allow culling of work pieces in an inverted configuration. Operation of the culling apparatus in this configuration also permits inspection of a side of the work pieces that is opposite to the side inspected when the inspection apparatus is in a standard configuration. Moreover, the culling apparatus is capable of singulating work pieces as well as separating a plurality of work pieces; thereby allowing a count of the number of work pieces travelling along the transport track.

I claim:

1. A singulating assembly for presenting work pieces to an inspection site, comprising:
    a track for transporting a plurality of work pieces; and
    a means for rotating in both a clockwise and a counterclockwise direction, the means for rotating having a first protrusion to block the track thereby preventing passage of work pieces so that a first work piece in line can be inspected, and having a second protrusion to pin at least one additional work piece against a portion of the track and to resiliently hold said at least one additional work piece in line while simultaneously allowing the first work piece to pass after the first work piece has been inspected.

2. The singulating assembly of claim 1 wherein the first protrusion is a nonresilient material having an L-shape.

3. The singulating assembly of claim 1 wherein the second protrusion is a resilient material having a beveled shape.

4. The singulating assembly of claim 1 wherein the work pieces move on the track under the influence of gravity.

5. A method for separating work pieces, which comprises:
    providing a gravity fed track for transporting a plurality of work pieces, wherein the gravity fed track has at least one insertion slot and an inspection window;
    providing a rotating means which cooperates with the gravity fed track, the rotating means having both a first protrusion and a second protrusion mounted thereon, and further having the capability of revolving in both clockwise and counterclockwise directions;
    providing a plurality of work pieces in a line on the gravity fed track;
    revolving the rotating means in a first direction wherein the first protrusion engages a portion of the gravity fed track to block a pathway of a first work piece at the inspection window; and revolving the rotating means in a second direction wherein the first protrusion disengages from the gravity fed track thereby allowing at least the first work piece to continue moving along the gravity fed track, and the second protrusion restrains a next work piece in the line, the next work piece blocks the pathway of succeeding work pieces in the line.

6. The method for separating work pieces of claim 5 further including oscillating the rotating means at a sufficient rate to allow the second protrusion to restrain the next work piece before the next work piece moves on the gravity fed track.

7. The method for separating work pieces of claim 5 further including restraining a predetermined work piece further removed from the work piece being inspected thereby separating a plurality of work pieces.

8. The method for separating work pieces of claim 5 further including forming the second protrusion from a resilient material.

9. A work piece culling apparatus comprising:
a transport track having at least one insertion slot wherein a plurality of work pieces move on transport track under a force of gravity; and
a means for culling at least one work piece from the plurality of work pieces on the transport track, the means for culling being mounted to a shaft of a drive and having a first gating mechanism and a second gating mechanism, both gating mechanisms being driven simultaneously and in a reciprocating fashion such that in a first position the first gating mechanism blocks a path of the plurality of work pieces whereas the second gating mechanism is disengaged from the at least one insertion slot, and in a second position the second gating mechanism frictionally restrains the plurality of work pieces whereas the first gating mechanism is disengaged from the at least one insertion slot.

* * * * *